US011959605B2

(12) United States Patent
Ritter et al.

(10) Patent No.: US 11,959,605 B2
(45) Date of Patent: Apr. 16, 2024

(54) LIGHTING DEVICE FOR A MOTOR VEHICLE AND PRODUCTION METHOD

(71) Applicant: Marelli Automotive Lighting Reutlingen (Germany) GmbH, Reutlingen (DE)

(72) Inventors: Michael Ritter, Wannweil (DE); Daniel Ruelke, Nuertingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 17/661,472

(22) Filed: Apr. 29, 2022

(65) Prior Publication Data

US 2022/0357010 A1 Nov. 10, 2022

(30) Foreign Application Priority Data

May 4, 2021 (DE) .......................... 102021111499.3

(51) Int. Cl.

| | |
|---|---|
| ***F21S 41/153*** | (2018.01) |
| ***F21S 41/20*** | (2018.01) |
| ***F21S 41/663*** | (2018.01) |
| ***F21Y 115/15*** | (2016.01) |

(52) U.S. Cl.

CPC ........... *F21S 41/153* (2018.01); *F21S 41/285* (2018.01); *F21S 41/663* (2018.01); *F21Y 2115/15* (2016.08)

(58) Field of Classification Search

CPC ....... F21S 41/153; F21S 41/663; F21S 41/285
See application file for complete search history.

(56) References Cited

U.S. PATENT DOCUMENTS

| | | | | |
|---|---|---|---|---|
| 10,480,743 B2 * | 11/2019 | Gao | F21S 43/239 |
| 10,746,368 B2 * | 8/2020 | Kogure | F21S 41/24 |
| 2015/0085523 A1 | 3/2015 | Gurtl et al. | |
| 2016/0252226 A1 * | 9/2016 | Shih | F21S 43/239 362/511 |

(Continued)

FOREIGN PATENT DOCUMENTS

| | | |
|---|---|---|
| DE | 3905779 A1 | 8/1990 |
| DE | 102018106171 A1 | 9/2019 |

(Continued)

OTHER PUBLICATIONS

Search Report for German Patent Application No. 10 2021 111 499.3 dated Jan. 10, 2022.

(Continued)

*Primary Examiner* — Eric T Eide
(74) *Attorney, Agent, or Firm* — Howard & Howard Attorneys PLLC

(57) ABSTRACT

The invention relates to a lighting device, for a motor vehicle, including a plurality of light sources, which have a plurality of primary lenses dedicated to each of the respective light sources for focusing the light emitted by the respective light sources. The lighting device also has a secondary optics element which has a plurality of light entry surfaces dedicated to each respective light source and one light exit surface. A grid is located downstream of the light exit surface on the secondary optics element in the exit direction of the light, for segmenting the light exiting the light exit surface.

12 Claims, 4 Drawing Sheets

(56) References Cited

U.S. PATENT DOCUMENTS

| | | | | |
|---|---|---|---|---|
| 2016/0265733 | A1* | 9/2016 | Bauer ..................... | F21S 41/16 |
| 2018/0238510 | A1* | 8/2018 | Gloss ...................... | F21S 41/24 |
| 2018/0320852 | A1 | 11/2018 | Mandl | |
| 2020/0149701 | A1* | 5/2020 | Monestier ............. | F21S 41/322 |
| 2021/0062993 | A1 | 3/2021 | Buisson et al. | |
| 2021/0164631 | A1 | 6/2021 | Niu et al. | |
| 2021/0341122 | A1 | 11/2021 | Moser et al. | |

FOREIGN PATENT DOCUMENTS

| | | | |
|---|---|---|---|
| DE | 112019000121 | T5 | 6/2020 |
| DE | 102019204523 | A1 | 10/2020 |
| DE | 102020107728 | A1 | 9/2021 |
| EP | 3608586 | A1 | 2/2020 |
| WO | 2014094017 | A1 | 6/2014 |
| WO | 2017066817 | A1 | 4/2017 |
| WO | 2019158890 | A1 | 8/2019 |

OTHER PUBLICATIONS

Communication dated Aug. 9, 2022 transmitting the Search Report dated Jul. 28, 2022 for European Patent Application No. 22171541.0.

* cited by examiner

LIGHTING DEVICE FOR A MOTOR VEHICLE AND PRODUCTION METHOD

CROSS-REFERENCE TO RELATED APPLICATIONS

The present application claims priority to and all the benefits of German Patent Application No. 10 2021 111 499.3, filed on May 4, 2021, which is hereby expressly incorporated herein by reference in its entirety.

BACKGROUND OF THE INVENTION

1. Field of the Invention

The invention relates to a lighting device for a motor vehicle and a method for the production of the components in the lighting device.

2. Description of the Related Art

The use of LED displays, OLEDs and microLEDs for generating signal light functions, such as blinkers or daytime running lights, is known from the prior art. The known systems are two dimensional for structural reasons and can therefore only follow a sweeping or tilting of a headlight design to a limited extent. Moreover, the large number of liquid crystal filter layers that is needed reduces the efficiency of these systems.

SUMMARY OF THE INVENTION

The object of the present invention is directed toward a lighting device that enables a flexible adaptation to a sweeping and/or tilting of a headlight design, and which can provide a respective signal light function at the legally necessary intensities, while requiring little installation space, in particular with regard to the installation depth.

The lighting device according to the invention comprises numerous light sources, and these light sources can each be activated individually or in at least one or more light source groups, which comprise a portion of the light sources, and has numerous primary lenses assigned to each light source for focusing the light emitted from the respective light source, and has a secondary optics element for projecting the focused light onto a lighting plane that has numerous light entry surfaces dedicated to each respective light source and one light exit surface, wherein there is a grid downstream of the light exit surface on the secondary optics element in the exit direction of the light, for segmenting the light exiting the light exit surface.

In one embodiment, the light sources are light emitting diodes, LEDs. The light sources can also comprise OLEDs or microLEDs. The light sources can preferably be activated individually, i.e. switched on and off, and/or dimmed. Alternatively or additionally, it can also be the case that one or more groups of light sources, which comprise a portion of the light sources, can each be activated individually.

In one embodiment, the primary lens may be a converging lens. Other optical elements such as reflectors or attachment lenses, such as catadioptric attachments, can also be used. Each primary lens focuses the light emitted from a light source, in particular in preferential direction. In one embodiment, the direction is a direction between the norm of the plane in which the light source is located, and a direction in or counter to the direction of travel for a motor vehicle.

The secondary optics element is at least partially transparent, made in particular of a material comprising plastic. The secondary optics element refracts the light beam entering the light entry surface at the light exit surface, which has a planar design in a desired direction. The desired direction comprises a direction in or counter to the direction of travel for a motor vehicle, or in a lateral direction in relation to the motor vehicle, depending in particular on the lighting function that can be generated therewith.

The grid segments the light exiting the light exit surface on the secondary optics element. The grid comprises numerous grid segments, and these individual grid segments are separated from one another by webs located between them. Each light source may have a dedicated grid segment.

In one embodiment, the grid is not transparent and may be made of a material comprising plastic.

When positioning the primary lenses and the secondary optics element in relation to one another, in one embodiment, the positioning tolerance lies within the width of the webs in the grid.

According to one advantageous embodiment, the light entry surfaces of the secondary optics element are stepped. This results in an overall light entry surface with numerous steps, wherein each step forms the light entry surface for the light from a respective light source. The stepped light entry surfaces deflect the entering light such that it can be refracted at the light exit surface in the desired direction. The light beams may be already aligned by the primary lens such that the light entry surfaces are basically perpendicular to light beams.

According to another embodiment, the secondary optics element and the grid form an integral component. The integral component then comprises the transparent secondary optics element and the opaque grid. By way of example, the component is made in a multi-component, for example, two-components, using an injection molding process. The secondary optics element may include a planar light exit surface. The planar light exit surface makes it easier to form the grid thereon.

According to another embodiment, the present invention may include at least one carrier element on which the light sources or a portion of the light sources are located. The carrier element may be formed by a circuit board. In this embodiment, the carrier element may include a rigid or flexible material. The circuit board is often substantially flat. This results in a component requiring little installation depth.

It may be the case that each primary lens is a separate component. Alternatively, numerous primary lenses can be combined to form a single component. The positioning of a respective primary lens, in particular the focal point of the primary lens, in relation to a respective light source, may require a high level of precision, with tolerances in the range of 0.1 mm to 0.2 mm. When numerous primary lenses are combined to form a single component, the necessary positioning precision must therefore be ensured.

According to an advantageous embodiment, the primary lenses may be located on the carrier element.

According to another embodiment, the light exit surface on the secondary optics element may be parallel to the plane of the carrier element.

According to another embodiment, a plate, which may be a transparent plate, is located downstream of the grid in the exit direction of the light. The positioning of the plate in relation to the grid is less critical than the positioning of the primary lenses in relation to the light sources and/or the secondary optics element, along with the grid, in relation to the primary lenses. The light exiting the light exit surface on the secondary optics element is already aimed accordingly. A very small and ideally uniform air gap of up to 0.5 mm may be desirable, however, in order to prevent projection errors and glare. In one embodiment, the plate is clear and/or colorless and/or plated, or partially plated and/or lasered and/or printed, or partially printed, with a coloration.

According to an advantageous embodiment, the plate comprises micro-optical elements, typically located on a light exit surface. The micro-optical elements may be necessary to generate a light distribution corresponding to legal requirements, for example. In one embodiment, the micro-optical elements are diffusing elements, for example, in the form of pillow-shaped lenses formed on the light exit surface of the plate.

The number of light sources, and therefore the number of grid segments, may be at least 50, preferably 100 to 1,000, in particular as many as 5,000 or more. However, those having ordinary skill in the art will appreciate that the present invention may employ any number of the plurality of light sources and the corresponding grid segments.

In one embodiment, the lighting device according to the invention is designed to generate a signal light function, such as a blinker function and/or a daytime running light function. The lighting device according to the invention generates the legally required intensities.

Advantageously, such a lighting function can be generated over a very wide angle with the lighting device according to the invention. The lighting device can therefore be used in motor vehicle lights with a sweep and/or tilt of up to 90°.

Further embodiments relate to a production method for the components in the lighting device according to the invention. The secondary optics element and the grid may be produced in a multi-component injection molding process, such as a two-component injection molding process, in which the grid is formed on surface forming the light exit surface of the secondary optics element.

The secondary optics element and the grid form an integral component according to this method. The integral component then comprises the secondary optics element, which may be transparent, and the grid, which may be opaque. In one embodiment, the stepped light entry surfaces are formed such that all of the steps can be removed from the mold in the same direction.

Other objects, features and advantages of the present invention will be readily appreciated as the same becomes better understood after reading the subsequent description taken in connection with the accompanying drawings.

BRIEF DESCRIPTION OF THE DRAWINGS

Exemplary embodiments of the invention are shown in the drawings and shall be explained in greater detail below. The same reference symbols are used in the various drawings for the same or at least comparable elements, with regard to their function. In the descriptions of the individual drawings, reference may also be made to elements in other drawings. Schematically therein.

DETAILED DESCRIPTION OF THE INVENTION

Figure 1:
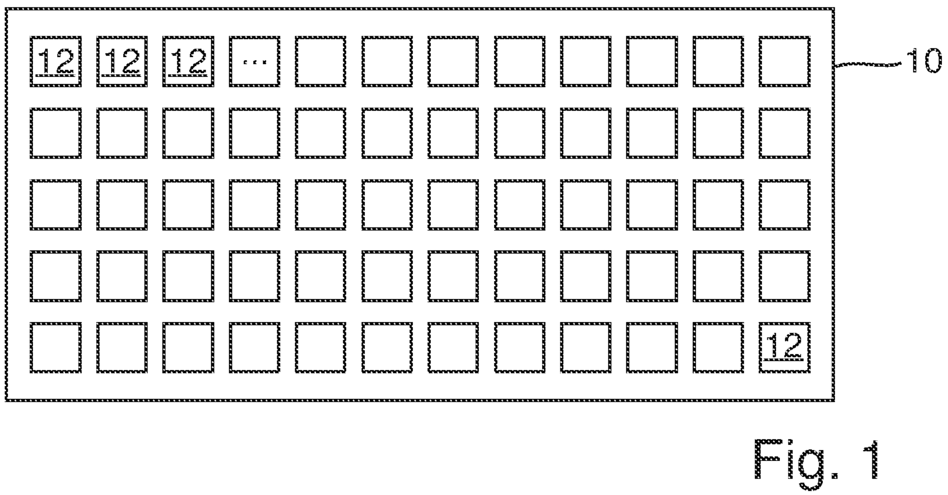
FIG. 1 shows elements of a lighting device according to the invention, in a schematic illustration.
Figure 2:
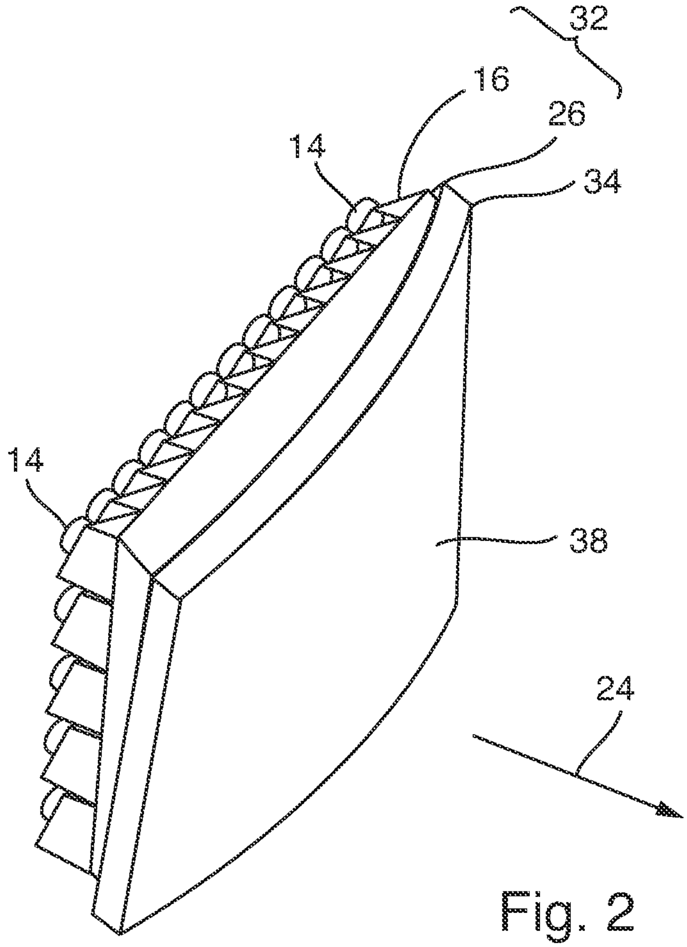
FIG. 2 shows other elements of the lighting device according to the invention, from a front perspective.
Figure 3:
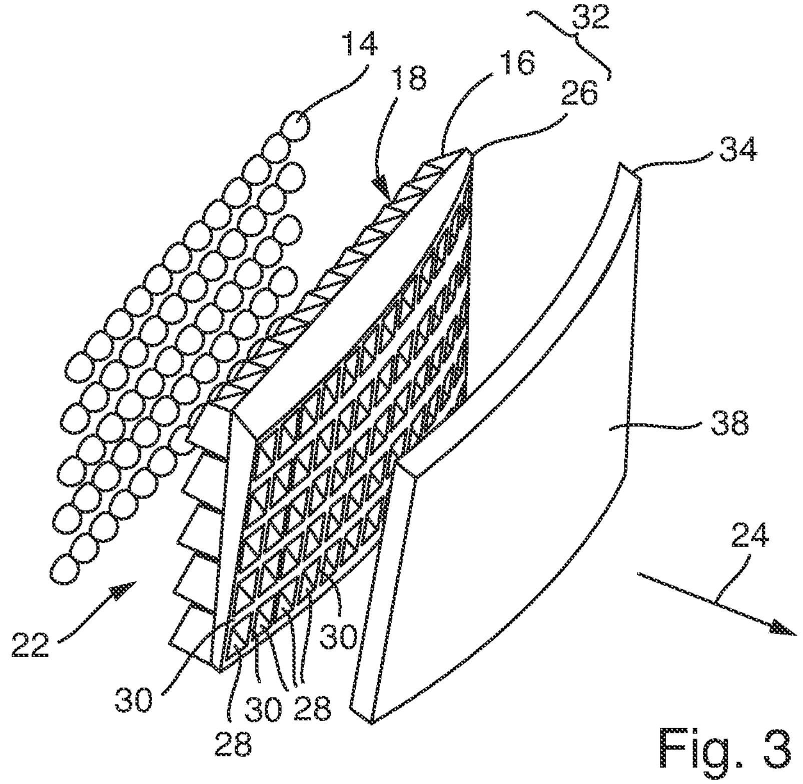
FIG. 3 shows the elements shown in FIG. 2 in an exploded view.
Figure 4:
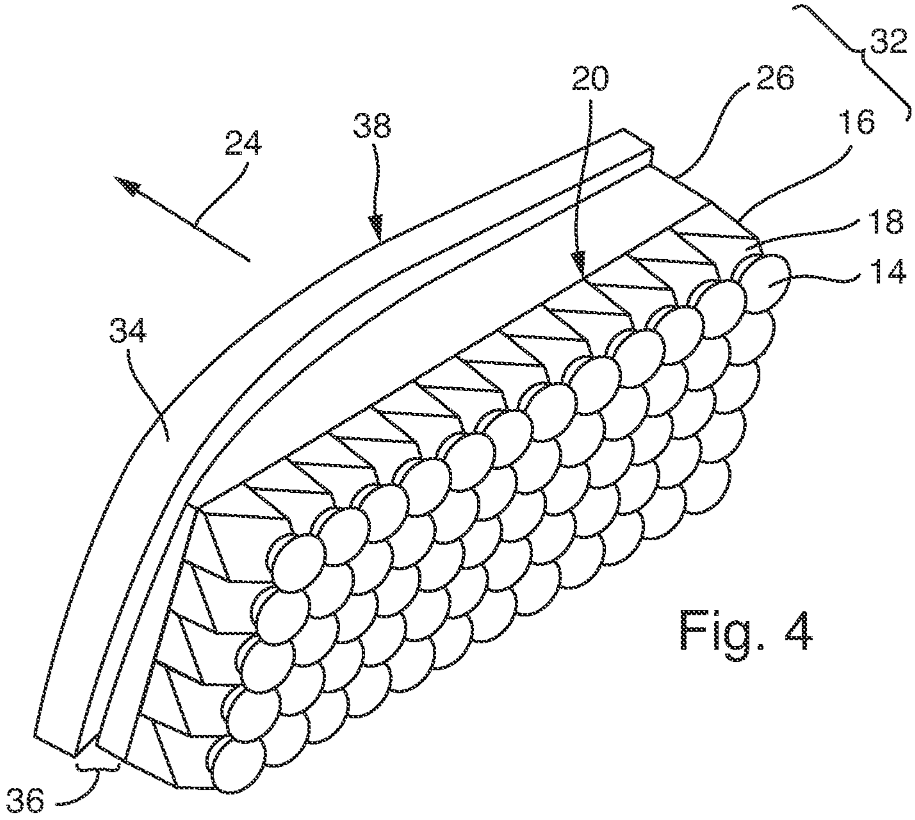
FIG. 4 shows the elements shown in FIGS. 2 and 3 from a rear perspective.
Figure 5:
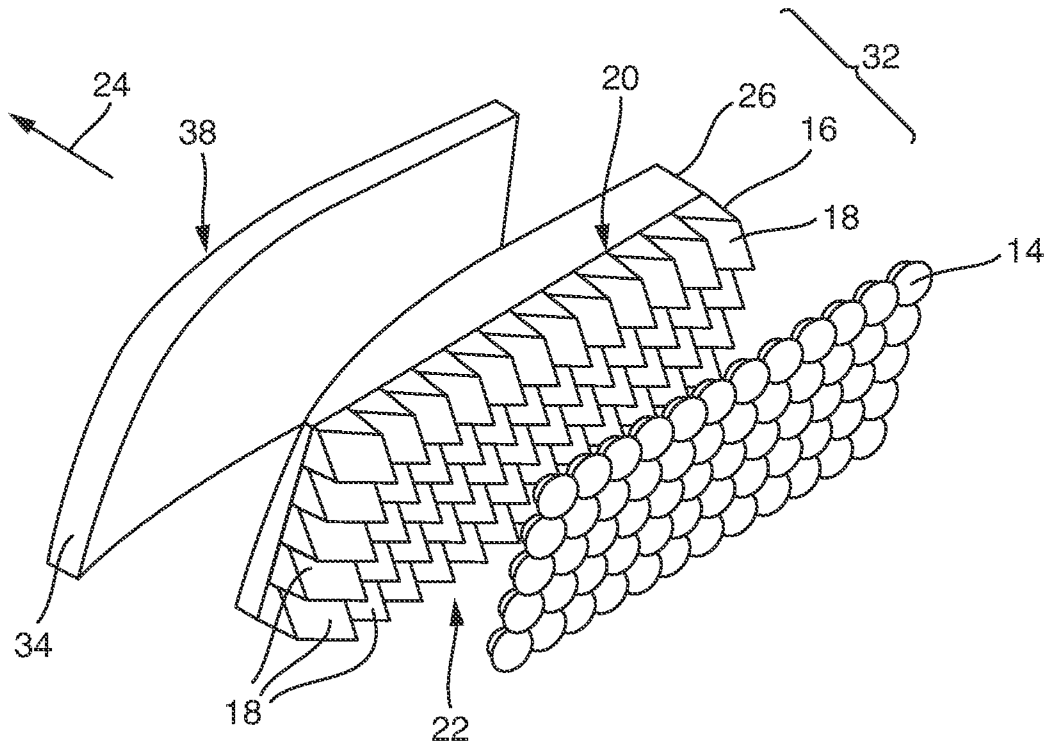
FIG. 5 shows the elements shown in FIG. 4 in an exploded view.
Figure 6:
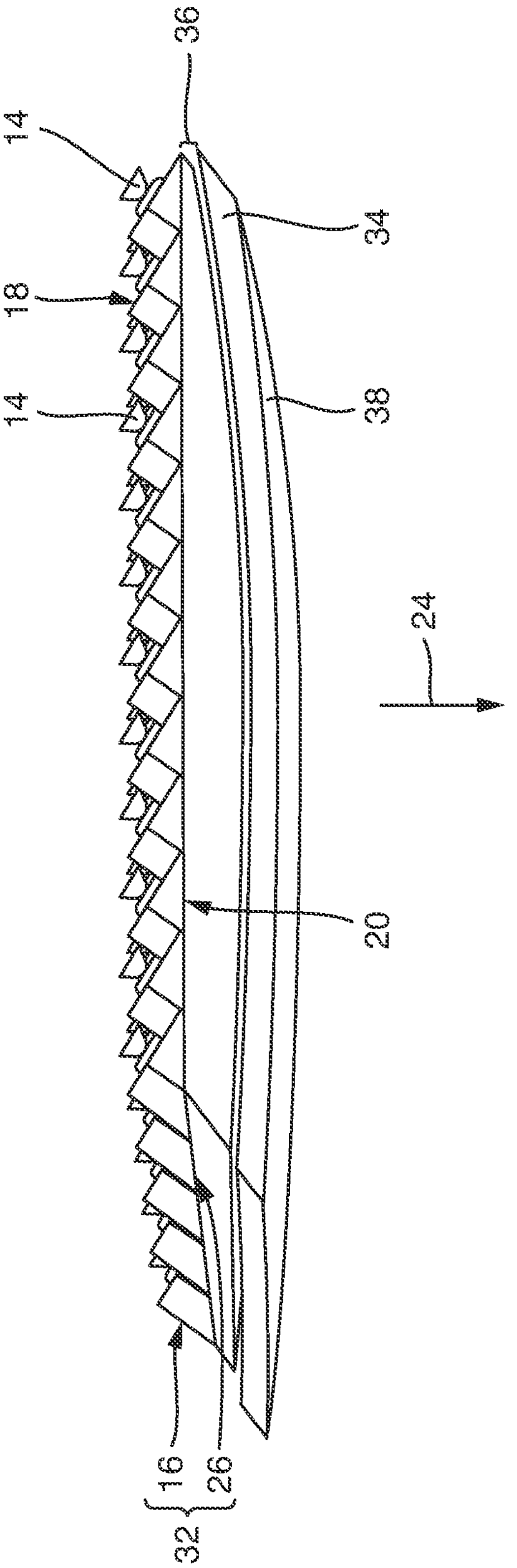
FIG. 6 shows the elements shown in FIGS. 2 to 5 in a top view.

FIG. 1 shows a carrier element 10 for a lighting device according to the present invention. In one embodiment, the carrier element 10 is a circuit board. The carrier element 10 may include a rigid or flexible material.

A plurality of light sources 12 may be located on the carrier element 10. The light sources 12 may include light emitting diodes, i.e. LEDs. The light sources 12 can preferably be activated individually, i.e. switched on and off, and/or dimmed. Alternatively or additionally, there can also be one or more groups of light sources, comprising a portion of the light sources 12, each of which can be activated individually.

Further elements of the lighting device according to the invention shall be explained in reference to FIGS. 2 to 6.

The lighting device may also include numerous primary lenses 14, each of which may be dedicated to a respective light source 12 for focusing the light emitted from the respective light source 12.

The primary lenses 14 may be formed as convergent lenses, by way of example. Each primary lens 14 focuses the light emitted from a light source 12, in a preferential direction. The preferential direction may be a direction between the norm of the plane in which the light source 12 is located, i.e. the plane of the carrier element 10, and a direction in or counter to the direction of travel for a motor vehicle.

According to one embodiment shown in the drawings, each primary lens 14 may be a separate component. According to an alternative embodiment, numerous primary lenses 14 can be combined to form a single component. When positioning a respective primary lens 14, in particular the focal point of the primary lens 14, in relation to a respective light source 12, a high level of precision is necessary, with tolerances lying in the range of 0.1 mm to 0.2 mm. When numerous primary lenses are combined to form a single component, this precision must therefore be ensured.

According to an advantageous embodiment that is not shown, the primary lenses 4 may be located on the carrier element 10.

The lighting device may also include a secondary optics element 16 for projecting the light focused by the primary lenses 14 onto a lighting plane. The secondary optics element 16 comprises numerous light entry surfaces 18, each of which is dedicated to a respective light source 12.

The secondary optics element 16 is at least partially transparent and made in particular of a material comprising plastic. The secondary optics element 16 refracts the light beams entering through the light entry surface 18 onto a light exit surface 20, which may be planar, in a desired direction. The desired direction may be a direction in or counter to the direction of travel for a motor vehicle, or a lateral direction in relation to the motor vehicle, depending on the lighting function it generates.

According to an advantageous embodiment, the light entry surfaces 18 on the secondary optics element 16 may be stepped. This results in an overall light entry surface 22 that has numerous steps, in which each step forms the light entry surface 18 for the light from a respective light source. The stepped light entry surfaces 18 deflect the entering light such that the light can then be refracted at the light exit surface 20 in the desired direction. The light beams are preferably already aligned by the primary lenses 14 such that the light entry surfaces 18 are basically perpendicular to the light beams.

According to one embodiment shown here, a grid 26 is located downstream of the light exit surface 20 on the secondary optics element 16 in the exit direction of the light, see arrow 24, for segmenting the light exiting the light exit surface 20.

The grid 26 segments the light exiting via the light exit surface on the secondary optics element. The grid 26 may include a plurality of grid segments 28, wherein the individual grid segments 28 are separated from one another by webs 30 located therebetween. The grid 26 extends in a plane, for example, resulting in a three-dimensional grid, due to the thickness or width of the webs 30. Alternatively, the grid 26 can also be bowed or curved. By way of example, the shape of the grid 26 may be obtained by projecting a two-dimensional grid onto a surface in space, in particular a section of a spherical surface. Each light source 12 may include a dedicated grid segment 28.

The grid 26, i.e. the webs 30 in the grid 26, are not transparent, and may be made of a material comprising plastic.

When positioning the primary lens 14 and the secondary optics element 16 in relation to one another, the positioning tolerance lies within the width of the webs 30 in the grid 26.

According to the embodiment shown here, the secondary optics element 16 and the grid 26 form an integral component 32. The integral component 32 then comprises the transparent secondary optics element 16 and the opaque grid 26. By way of example, the component 32 is made in a multi-component, such as a two-component, injection molding process. The secondary optics element 16 may include a planar light exit surface. The planar light exit surface 20 makes it easier to form the grid 26 thereon. Advantageously, the stepped light entry surfaces may be formed such that all of the steps can be removed from the mold in the same direction.

The light exit surface 20 on the secondary optics element 16 may be parallel to a plane of the carrier element 10 in the overall structure of the lighting device, e.g. a combination of the FIGS. 1 and 2 to 5.

Furthermore, according to the embodiment shown here, a plate 34, which may be a transparent plate, is located downstream of the grid 26 in the exit direction 24 of the light. The positioning of the plate 34 in relation to the grid 26 is less critical than the positioning of the primary lenses 14 in relation to the light sources 12 and/or the secondary optics element 16, along with the grid 26, in relation to the primary lenses 14. The light exiting the light exit surface 20 on the secondary optics element 16 is already aimed accordingly. A very small and ideally uniform air gap 36 of up to 0.5 mm is desirable, however, in order to prevent projection errors and glare.

According to an advantageous embodiment, the plate 34 may include micro-optical elements, in particular on a light exit surface 38. The micro-optical elements may be necessary to generate a light distribution corresponding to legal requirements, for example. The micro-optical elements are diffusing elements, for example, in the form of pillow-shaped lenses formed on the light exit surface 38 of the plate 34.

The number of light sources 12 that are shown, and the number of primary lenses 14 and the number of grid segments 28 is merely exemplary. In the lighting device according to the invention, the number of light sources 12, and therefore the number of primary lenses 14 and grid segments 28, is at least 50, preferably 100 to 1,000, and up to 5,000 or more. However, those having ordinary skill in the art will appreciate that any suitable number of primary lenses and grid segments may be employed. The grid segments 28 can be arranged in an arbitrary number of rows and columns. There may be seven to sixteen rows, for example.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A lighting device for a motor vehicle wherein the lighting device is designed to generate a signal function comprising: a plurality of light sources, wherein the plurality of light sources can each be activated individually or at least in one or more light source groups, and wherein a portion of the plurality of light sources have a plurality of primary lenses dedicated to each of the respective plurality of light sources for focusing the light emitted by the respective light sources, and has a secondary optics element for projecting the focused light onto a lighting plane, which has a plurality of light entry surfaces dedicated to each respective light source and one light exit surface, wherein a non-transparent grid is located downstream of the light exit surface on the secondary optics element in the exit direction of the light, for segmenting the light exiting the light exit surface, wherein the grid comprises a plurality of grid segments dedicated to a respective light source of the plurality of light sources, wherein each primary lens focuses the light emitted from a light source, in a preferential direction, wherein the preferential direction is a direction between the norm of the plane in which the light source is located, and a direction in or counter to the direction of travel for a motor vehicle and wherein the secondary optics element refracts the light beam entering the light entry surface at the light exit surface in a direction in or counter to the direction of travel for a motor vehicle, or in a lateral direction in relation to the motor vehicle, and wherein the grid comprises a bowed or curved shape.

2. The lighting device as set forth in claim 1, wherein the plurality of light entry surfaces on the secondary optics element are stepped.

3. The lighting device as set forth in claim 1, wherein the secondary optics element and the grid form an integral component.

4. The lighting device as set forth in claim 1, further including at least one carrier element, wherein the plurality of light sources or a portion of the plurality of light sources are arranged on the carrier element.

5. The lighting device as set forth in claim 1, wherein a respective primary lens is a separate component, or that the plurality of primary lenses are combined to form a single component.

6. The lighting device as set forth in claim 4, wherein the plurality of primary lenses are arranged on the carrier element.

7. The lighting device as set forth in claim 1, wherein the light exit surface on the secondary optics element is parallel to a plane of the carrier element.

8. The lighting device as set forth in claim 1, wherein a plate, in particular a transparent plate, is located downstream of the grid in the exit direction of the light.

9. The lighting device as set forth in claim 8, wherein the plate comprises micro-optical elements, in particular on a light exit surface.

10. The lighting device as set forth in claim 1, wherein the number of the plurality of light sources is at least 50, preferably 100 to 1,000, in particular up to 5,000 or more.

11. The lighting device as set forth in claim 1, wherein the lighting device is designed to generate a blinker function and/or a daytime running light function.

12. A method for producing components for the lighting device as set forth in claim 1, wherein the secondary optics element and the grid are produced in a multi-component injection molding process, wherein the grid is formed on a surface of the secondary optics element forming the light exit surface.

* * * * *